United States Patent
Gilbert et al.

(10) Patent No.: US 11,053,973 B2
(45) Date of Patent: Jul. 6, 2021

(54) DRY RUNNING BALL JOINT MECHANICAL SEAL

(71) Applicant: Flowserve Management Company, Irving, TX (US)

(72) Inventors: Lee M. Gilbert, Kalamazoo, MI (US); Joshua J. Leyrer, Portage, MI (US); Christopher J. Ropp, Kalamazoo, MI (US)

(73) Assignee: Flowserve Management Company, Irving, TX (US)

( * ) Notice: Subject to any disclaimer, the term of this patent is extended or adjusted under 35 U.S.C. 154(b) by 133 days.

(21) Appl. No.: 16/678,296

(22) Filed: Nov. 8, 2019

(65) Prior Publication Data

US 2021/0140469 A1    May 13, 2021

(51) Int. Cl.
*F16C 11/06* (2006.01)

(52) U.S. Cl.
CPC ...... *F16C 11/0676* (2013.01); *F16C 11/0623* (2013.01)

(58) Field of Classification Search
CPC .............. F16C 11/0676; F16C 11/0623; F16C 11/0652; F16C 11/0666; F16C 11/0671; F16C 11/0633
See application file for complete search history.

(56) References Cited

U.S. PATENT DOCUMENTS

| | | | | |
|---|---|---|---|---|
| 3,832,022 A | * | 8/1974 | Reinsma | F16C 11/0614 384/146 |
| 3,947,077 A | * | 3/1976 | Berg | F16C 11/0676 384/147 |
| 2008/0019766 A1 | * | 1/2008 | Flaim | F16C 11/0609 403/122 |
| 2010/0262250 A1 | | 10/2010 | Kellar et al. | |

FOREIGN PATENT DOCUMENTS

| | | |
|---|---|---|
| JP | 07260066 A | 10/1995 |
| JP | 2013083287 A | 5/2013 |
| JP | 2016014441 A | 1/2016 |
| KR | 1020140003861 A | 1/2014 |

OTHER PUBLICATIONS

International Search Report and Written Opinion for PCT Appl. No. PCT/US2020/057367, dated Feb. 22, 2021, 11 Pages.

* cited by examiner

*Primary Examiner* — Daniel J Wiley
(74) *Attorney, Agent, or Firm* — Maine Cernota & Rardin (57) ABSTRACT

A dry running mechanical ball joint seal includes a spherical element penetrated by a central passage and suspended between support rings that are pressed by springs against the spherical element and form a sliding dry seal therewith. A lip seal is located between the support rings and includes wipers pressed radially inward by a lip seal spring to form an additional seal with the spherical element. In embodiments directed to piping systems, a fluid is able to flow through the central passage. Other embodiments include a sliding rod directed through the central passage and sealed to the spherical element by a rod support within the central passage and also by at least one rod lip seal having a wiper pressed by a spring against the rod. The rod support can include a compressible packing material and/or a linear ball bearing sealed to the spherical element within the central passage.

10 Claims, 8 Drawing Sheets

DRY RUNNING BALL JOINT MECHANICAL SEAL

FIELD OF THE INVENTION

The invention relates to mechanical seals, and more particularly, to mechanical seals that provide angular, rotational and axial mobility.

BACKGROUND OF THE INVENTION

Figure 1:
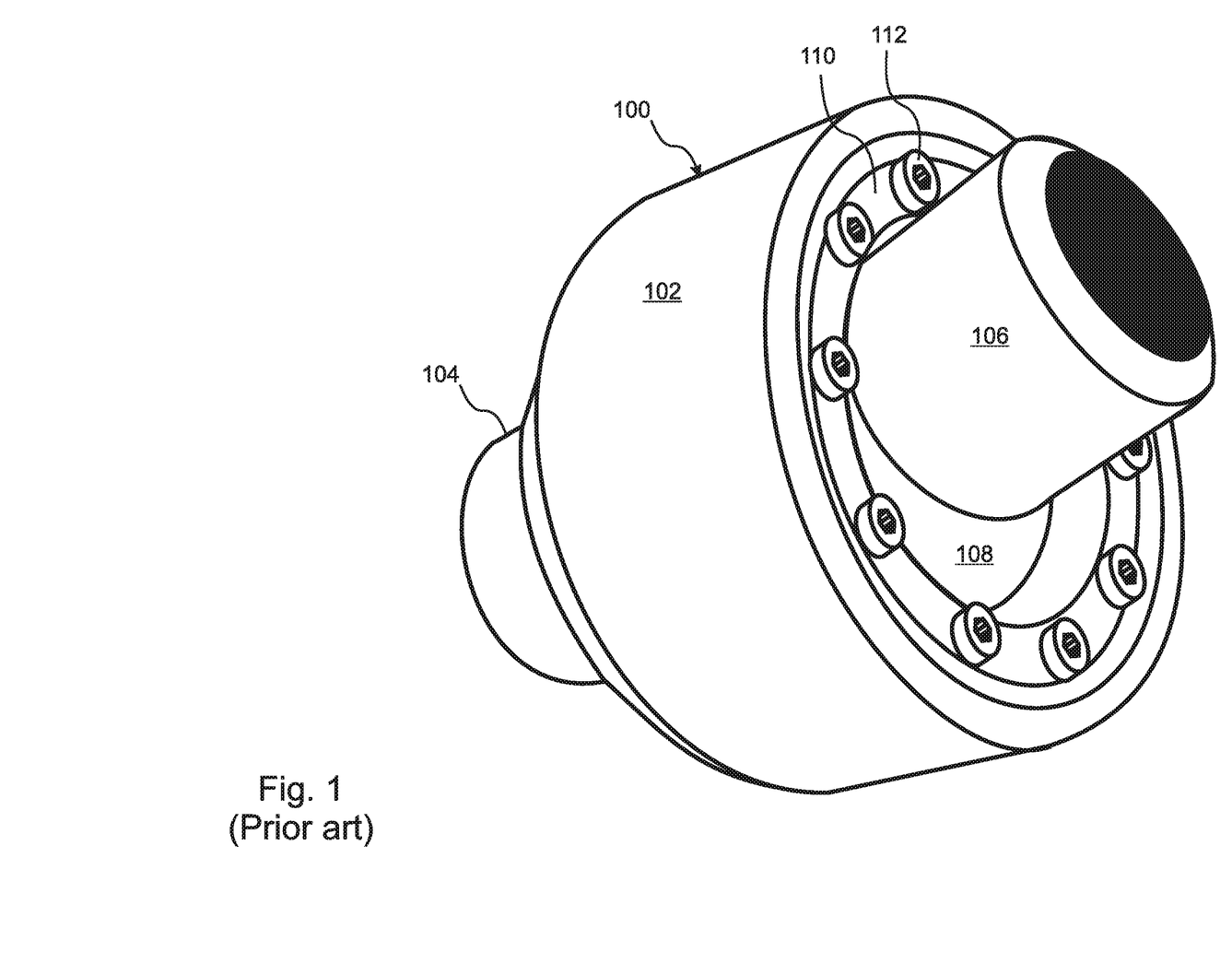
FIG. 1 is a perspective view of a ball joint seal of the prior art that is suitable for piping systems.

Requirements sometimes arise in the refinery and petrochemical industries, among others, wherein a piping system is required to compensate for thermal growth, vibration, or motion of equipment. In a typical example, it may be necessary to provide a joint in the piping system that can provide up to 30° total angular variability capability and up to 360° rotational freedom. FIG. 1 illustrates an example of a ball-joint connector 100 that meets these requirements, where the illustrated example is designed for use in oil extraction systems that implement thermal processes. In particular, the ball joint connector 100 that is illustrated in FIG. 1 includes a housing 102, an inlet 104 that is integral with the housing, an outlet 106 that extends from a "spherical element," i.e. a ball-shaped element 108 within the housing 102, and a ring 110 that can be tightened by bolts 112 so as to compress packing (not shown) around the ball-shaped element 108, thereby forming a seal.

Figure 2A:
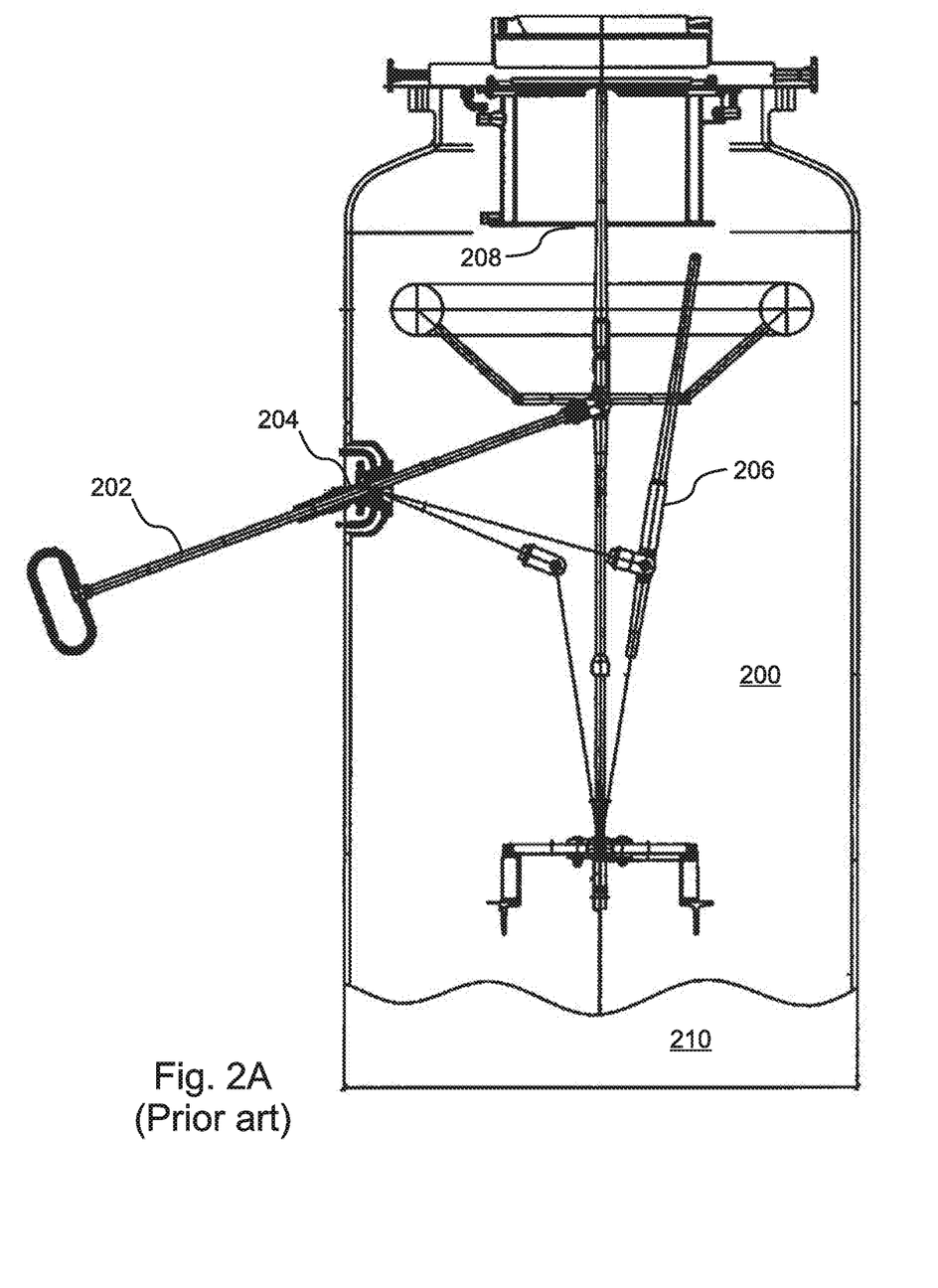
FIG. 2A is a cross sectional view of a sealed tank that is penetrated by a ball joint seal and manipulating rod of the prior art.

With reference to FIG. 2A, other requirements for an angularly variable, rotatable seal can sometimes arise, for example in relation to stoking equipment requirements for chemical plants that produce acetylene and other petroleum-derived products, where mechanical access to the interior of a sealed container or tank 200 is required with angular, rotational, and axial flexibility. In the example of FIG. 2A, a manipulating rod 202 enters the tank 200 through a ball joint seal 204 that enables the rod 202 to be tilted over a range of angles, rotated, and also extended and withdrawn axially through the ball joint seal 204, all without compromising the seal of the tank 200. In the illustrated example the manipulating arm 202 is able to actuate a wiper tool 206 within the tank 200 so as to dislodge debris from a heated grate 208 and allow it to fall thru the bottom 210 of the tank 200 to a collection area.

Figure 2B:
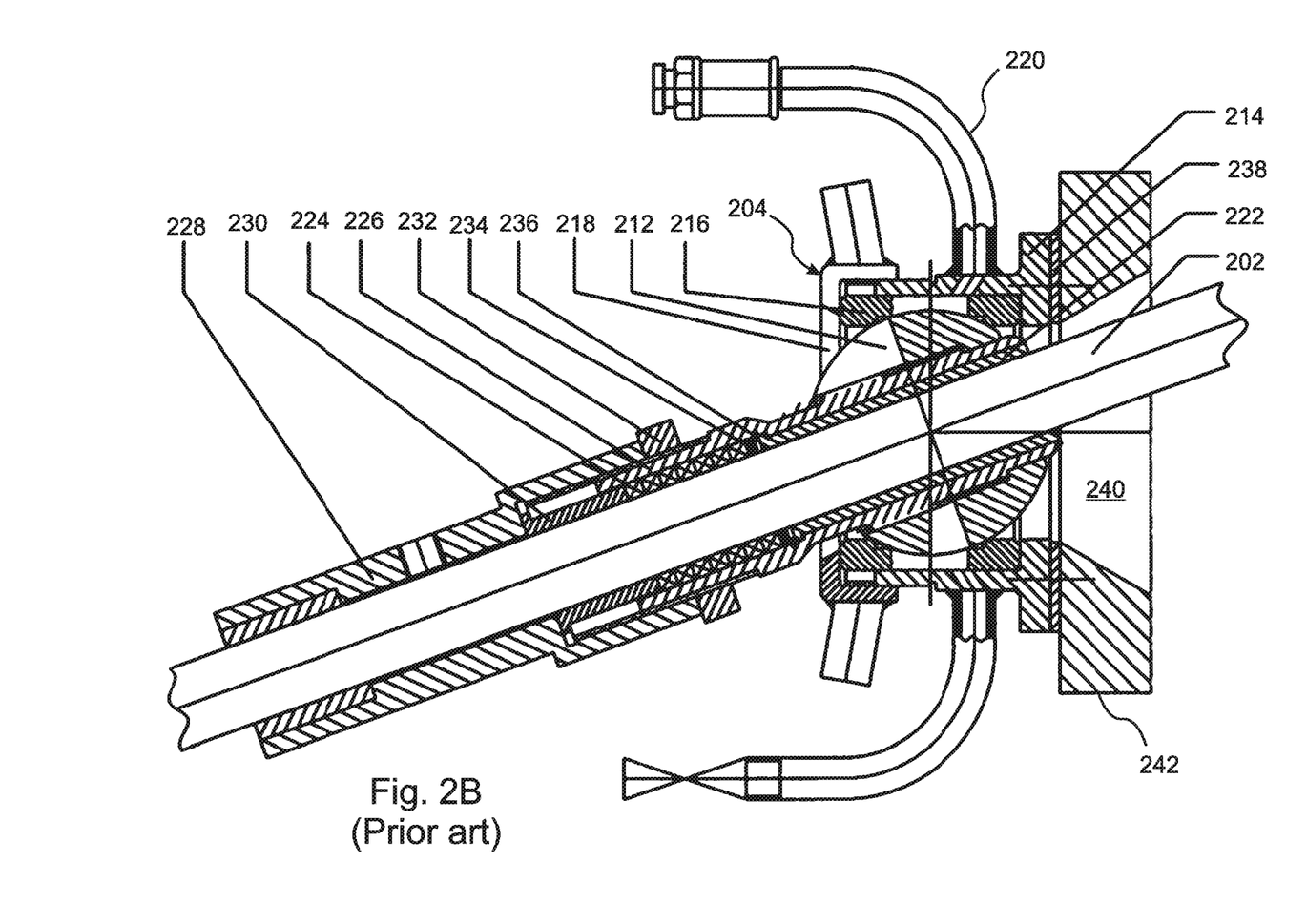
FIG. 2B is a close-up cross sectional view of the prior art ball joint seal of FIG. 2A.

FIG. 2B presents a cross-sectional view of the ball joint seal 204 of FIG. 2A. In this example, the seal 204 is mounted by a backing plate 238 over an opening 240 in the wall 242 of the tank 200. The spherical element 212 of the seal is constrained within the housing 214 by a pair of rings 216 that are pressed onto the spherical element 212 by rotation of a threaded cover 218 onto the housing 214. The housing 214 is filled with a grease that is supplied through a greasing tube 220, whereby the grease acts as a sealing fluid that maintains the seal between the spherical element 212 and the rings 216, and thereby between the spherical element 212 and the housing 214.

The manipulating rod 202 extends through an inner sleeve 222 that penetrates and is fixed to the spherical element 212. A proximal end 226 of the inner sleeve 222 is enlarged in diameter, thereby creating a space between the inner sleeve 222 and the manipulating rod 202 that is filled with packing 224. An outer sleeve 228 surrounds a proximal segment of the manipulating rod 202 and includes a region of enlarged diameter at its distal end that overlaps a threaded proximal end of the inner sleeve 222, where it is held in place by a locking nut 232 that is threaded onto the inner sleeve 222. As the locking nut 232 is tightened, the outer sleeve 228 is axially advanced in the distal direction, causing a proximal collar 230 to be pressed by the outer sleeve 228 against a proximal end of the packing 224, while an O-ring 234 at a distal end of the packing 224 is compressed against a distal collar 236 that is contained within the inner sleeve 222. The packing 224 and the O-ring 234 are saturated by grease, thereby maintaining a seal between the inner sleeve 222 and the manipulating rod 202.

While the approaches that are illustrated by the examples of FIGS. 1, 2A, and 2B are effective, they require frequent maintenance, due mainly to the use of grease as a sealing fluid. In particular, the bolts 112 in the example of FIG. 1 and the threaded cover 218 and locking nut 232 in the example of FIG. 2B must be tightened frequently, in some cases every week or even every day, so as to maintain the seals. In addition, the packing in both examples requires periodic re-greasing.

What is needed, therefore, is a ball joint mechanical seal that is a dry running seal, in that it does not require a sealing fluid, and that does not require frequent tightening or other frequent adjustments or maintenance.

SUMMARY OF THE INVENTION

The present invention is a ball joint mechanical seal that is a dry running seal, in that it does not require a sealing fluid. The ball joint mechanical seal is configured such that it is self-adjusting in response to wear, such that it does not require frequent tightening or other adjustments to compensate for wear.

The invention includes a spherical element that is suspended by support rings within a housing and is penetrated by a central, cylindrical passage. A seal is formed between the spherical element and the housing by the support rings as well as by a double lip seal that is fixed and sealed to the housing, and that surrounds the spherical element between the support rings and forms a dry seal with the spherical element.

The spherical element lip seal includes a pair of opposing wipers that are pressed against the surface of the spherical element by corresponding canted coil springs that maintain a compression of the wipers against the spherical element. In addition, the support rings are pressed by support ring springs against the spherical element, thereby maintaining a compression/force of the support rings against the spherical element. The springs thereby automatically compensate for wear of the support rings, lip seal wipers, and spherical element, so that fluids are prevented from leaking past the spherical element, without requiring any periodic tightening or other adjustments, despite any wear that might occur to the wipers, to the support rings, and/or to the spherical element.

In some embodiments that are applicable to piping systems, the ball joint seal is configured to enable fluids to flow through the central passage. In other embodiments that are configured to provide access by a sliding rod into a sealed tank, the sliding rod extends through the central passage of the spherical element, and a seal is formed between the spherical element and the sliding rod by a rod support within the central passage, and by at least one rod lip seal. In some of these embodiments, the rod support is formed by packing. In other embodiments, the rod support is a linear ball bearing.

The present invention is a ball joint seal that includes a spherical element having an exterior surface, a portion of said exterior surface being a spherical portion, in that it is shaped as a portion of a sphere surrounding a spherical center, the spherical element being penetrated by a central passage having a longitudinal axis that passes through said spherical center The ball joint seal further includes a housing surrounding the spherical element, a pair of support rings axially pressed against opposing sides of the spherical portion of the spherical element, the support rings being radially fixed to and sealed to the housing, at least one of the support rings being axially slidable relative to the housing, at least one support spring configured to compress the support rings against the spherical element and a substantially annular ball lip seal encircling the spherical portion of the spherical element and surrounding the spherical center of the spherical element, the ball lip seal being located between the pair of support rings and being fixed to and sealed to the housing, the ball lip seal comprising a ball wiper blade that is pressed radially inward by a ball spring against the spherical portion of the spherical element to form a sliding seal therewith.

In embodiments, the lip seal includes a pair of ball wiper blades and corresponding ball springs.

In either of the above embodiments, both of the support rings can be axially slidable relative to the housing, and the at least one support spring can comprise a plurality of support springs configured to press both of the support rings toward the spherical element.

Any of the above embodiments can further include a first fluid port providing fluid access to a proximal end of the central passage and a second fluid port providing fluid access to the distal end of the central passage, the ball joint seal being thereby configured for implementation in a piping system.

Or, the ball joint seal can include a sliding rod extending axially through the central passage and being axially slidable therethrough, a rod support surrounding and radially supporting the sliding rod within the central passage, the rod support being fixed to and sealed to the spherical element and a rod lip seal fixed and sealed to the spherical element at an end of the central passage, the rod lip seal comprising a rod wiper blade that is pressed radially inward against the sliding rod by a rod spring to form a sliding seal with the sliding rod. In any of these embodiments, the rod support can be formed by a compressible packing, and the ball joint seal can further include an inner sleeve surrounding the sliding rod within the central passage axially adjacent to the rod support and a compression mechanism configured to apply an axial force to the inner sleeve, thereby axially compressing the rod support and causing a radially inward expansion of the rod support against the sliding rod.

Or, the rod support can be formed by a linear ball bearing. In some of these embodiments, the ball joint seal comprises a pair of rod lip seals having corresponding rod wiper blades and rod springs, the pair of rod lip seals being fixed and sealed to the spherical element at opposing ends of the central passage.

In any of the above embodiments, the spherical element can be rotatable about the longitudinal axis of the central passage over any desired angle.

And in any of the above embodiments, the spherical element can be rotatable about an axis perpendicular to the longitudinal axis of the central passage over a range of at least 30 degrees total angular variability.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 3A:
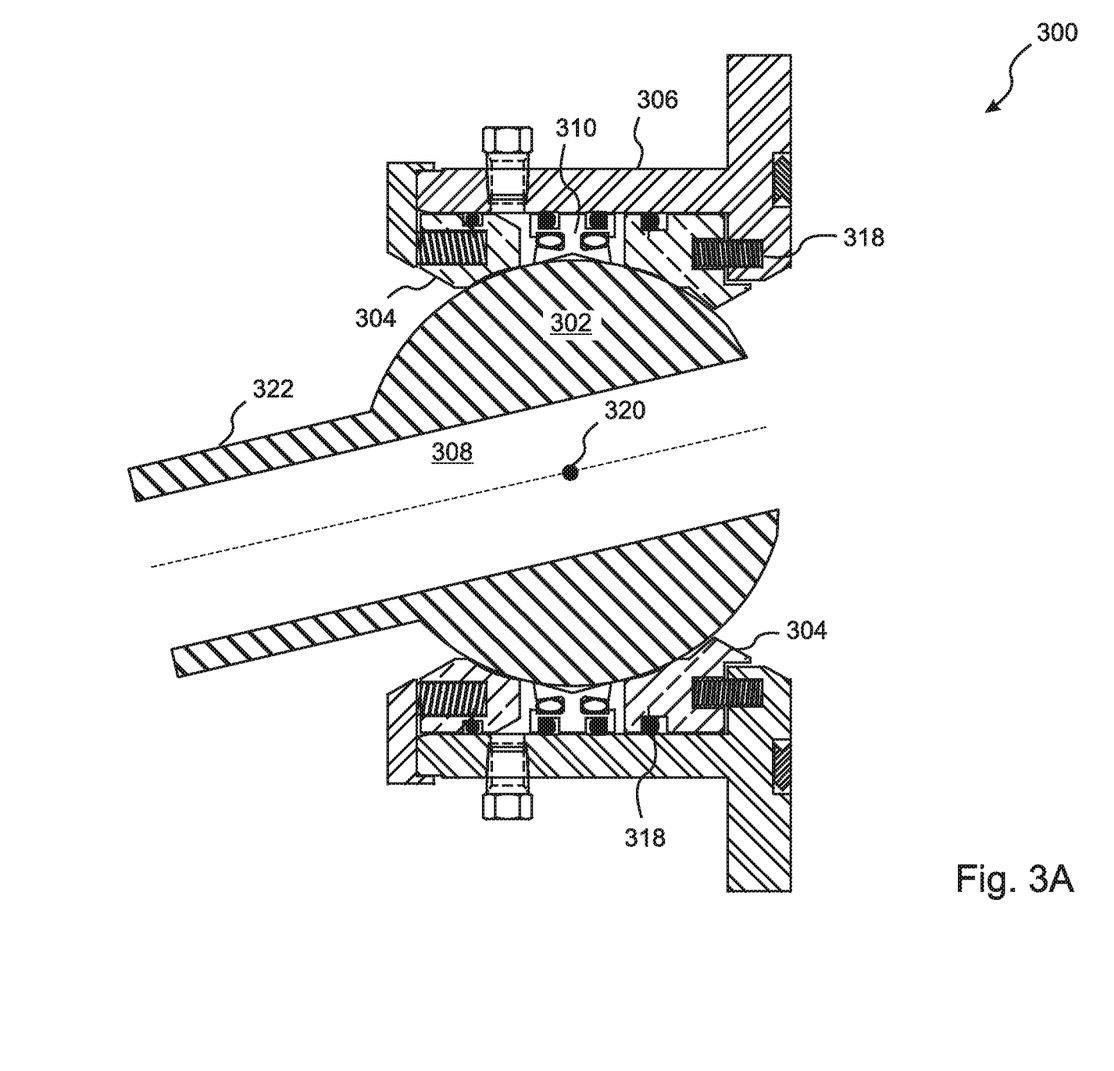
FIG. 3A is a cross sectional view of a ball joint seal in an embodiment of the present invention that is suitable for piping systems.

With reference to FIG. 3A, the present invention is a ball joint mechanical seal 300 that is a dry seal, in that it does not require a sealing fluid. The ball joint mechanical seal 300 is configured such that it automatically compensates for wear, and does not require frequent tightening or other adjustments.

The invention includes a spherical element 302 that is suspended by support rings 304 within a housing 306 and is penetrated by a central, cylindrical passage 308. It can be seen in FIG. 3A that a portion of the exterior surface of the spherical element 302 is shaped as a portion of a sphere surrounding a spherical center 320, and that the central passage 308 has a longitudinal axis 322 that passes through said spherical center 320. In the illustrated embodiment, the support rings 304 are radially fixed, axially dynamic, and sealed to the housing 306 by O-rings 318. A dry sliding seal is formed between the spherical portion of the spherical element 302 and the housing 306 by the support rings 304. In addition, the ball joint seal 300 includes a substantially annular double lip seal 310 (the "spherical element lip seal") that can travel axially and is sealed to the housing 306, surrounds the spherical center of the spherical element 302 between the support rings 304, and forms the primary dry seal with the spherical portion of the spherical element 302.

Figure 3B:
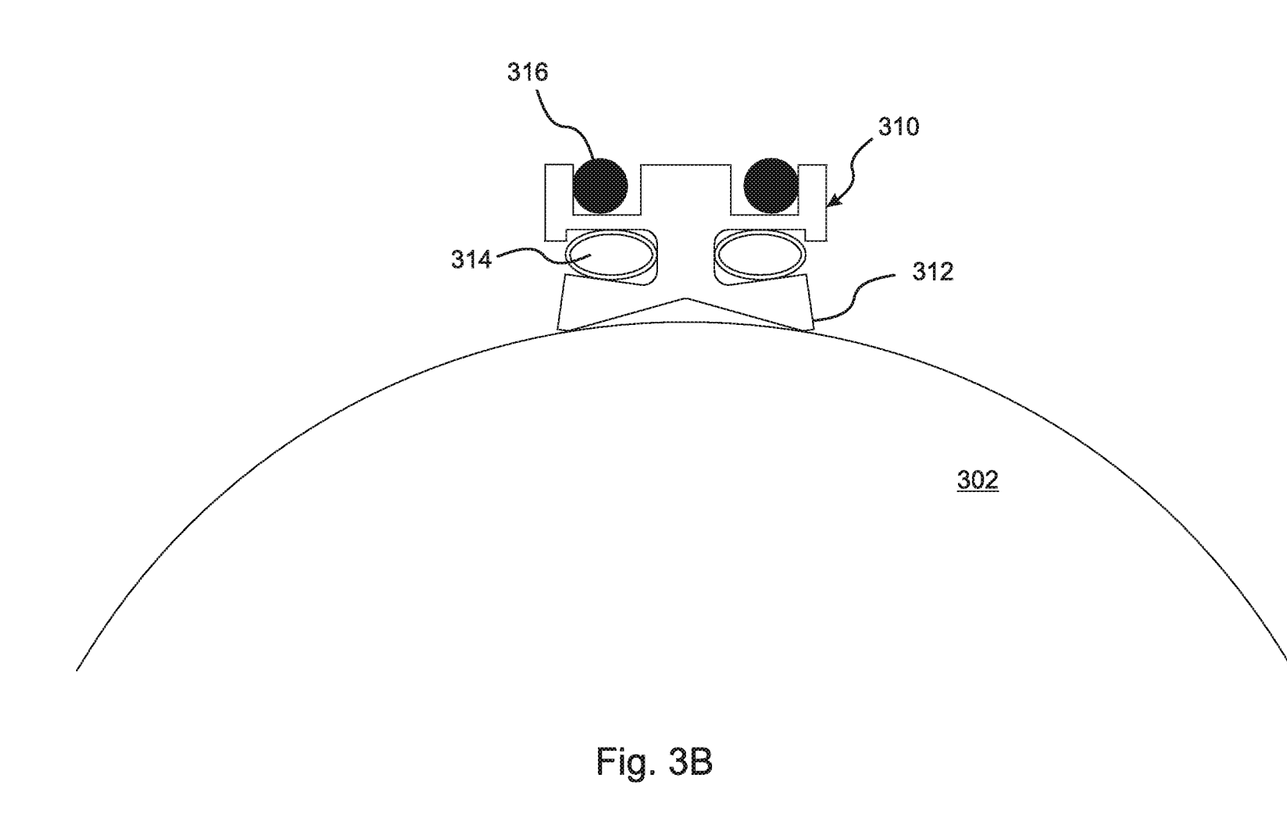
FIG. 3B is a close-up cross sectional view drawn to scale of the ball lip seal that is included in the ball joint seal of FIG. 3A.

With reference to FIG. 3B, the spherical element lip seal 310 include a pair of opposing wipers 312 that are pressed against the spherical surface of the spherical element 302 by corresponding canted coil springs 314 that maintain a compression of the wipers 312 against the spherical element 302. In the embodiment of FIGS. 3A and 3B, the spherical element lip seal 310 is sealed to the housing 306 by O-rings 316.

With reference again to FIG. 3A, the support rings 304 are pressed by support ring springs 318 against the spherical element 302, thereby maintaining a compression of the support rings 304 against the spherical element 302 and automatically compensating for any wear of the support rings 304 and/or the spherical element 302. The seals that are provided by the support rings 304 and the lip seal 310 thereby prevent any fluids from leaking past the spherical element 302, without requiring any periodic tightening or other adjustments, despite any wear that might occur to the wipers 312, to the support rings 304, and/or to the spherical element 302.

Figure 4A:
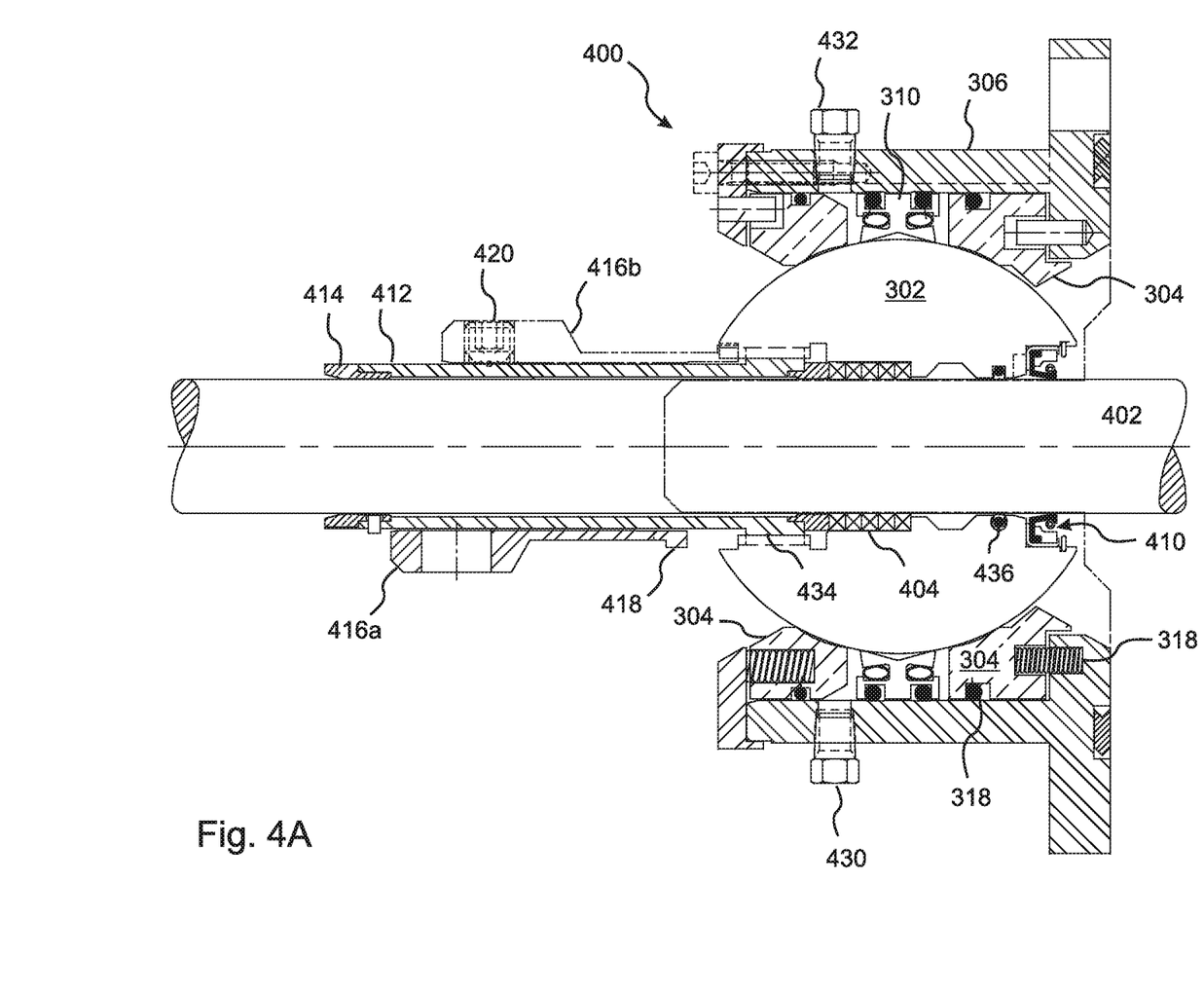
FIG. 4A is a cross sectional view drawn to scale of a ball joint seal in an embodiment of the present invention that is suitable for directing a sliding rod into a sealed volume.
Figure 4B:
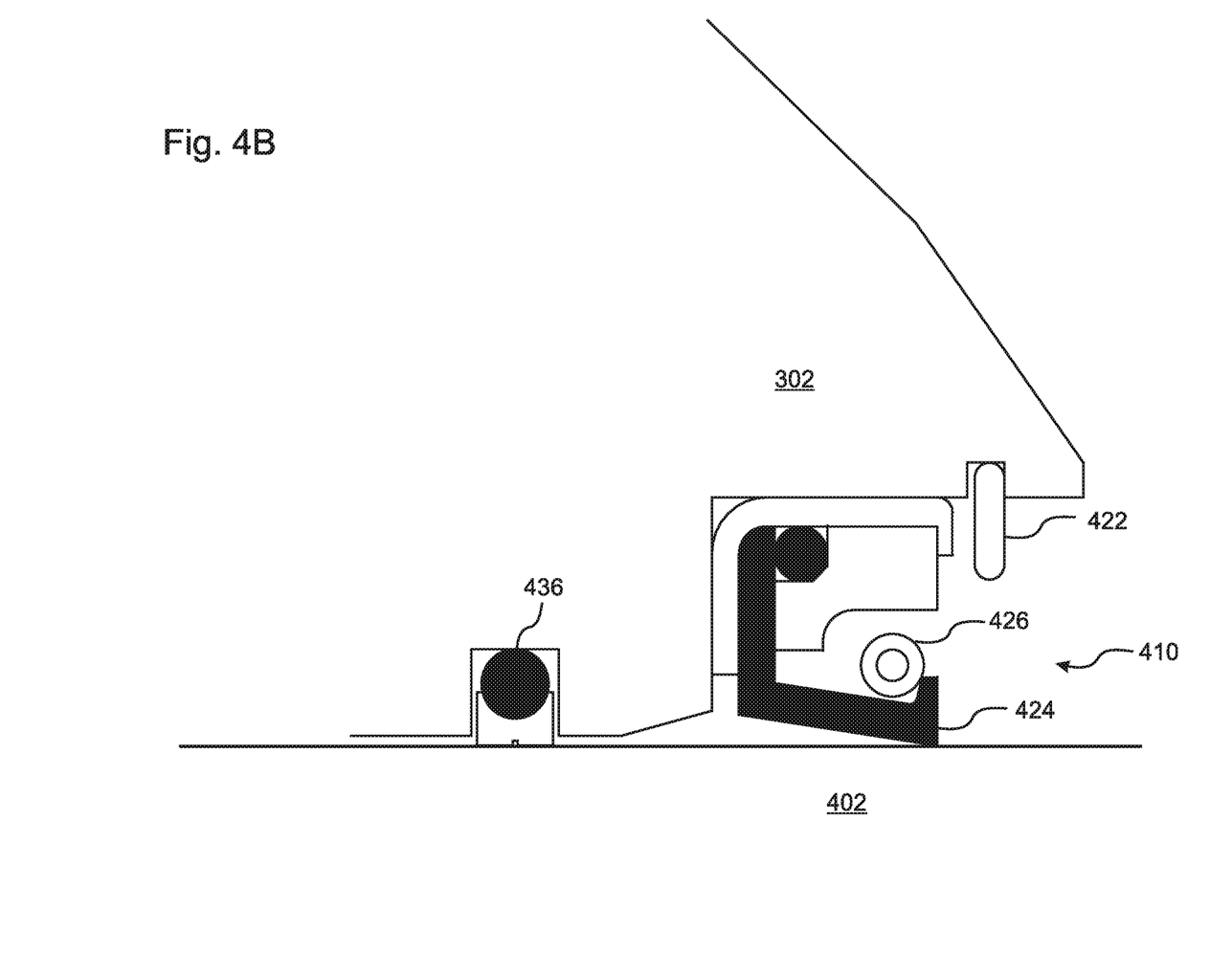
FIG. 4B is a close-up cross sectional view drawn to scale of the rod O-ring seal and rod lip seal that are included in the ball joint seal of FIG. 4A.
Figure 5:
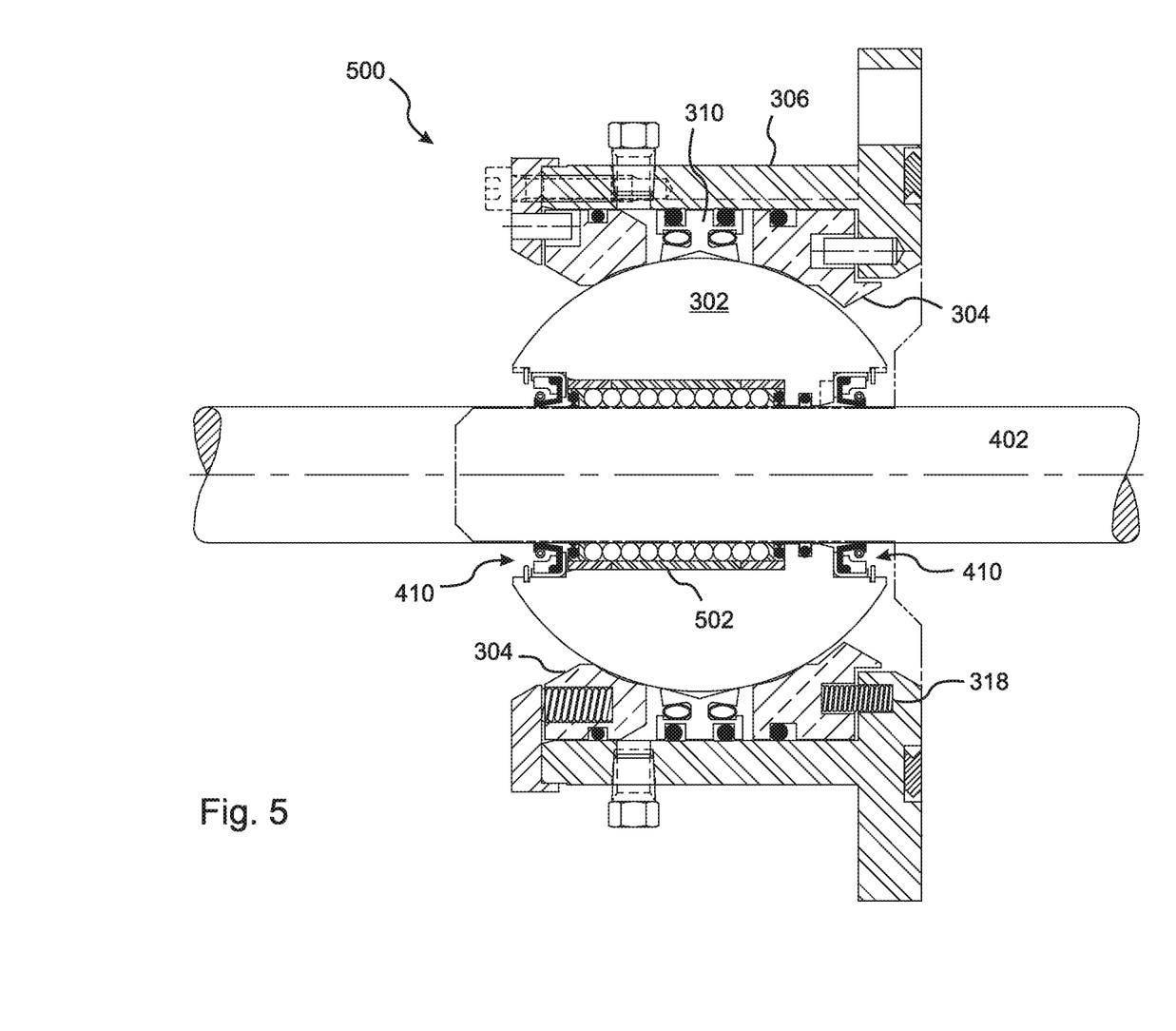
FIG. 5 is a cross sectional view drawn to scale of a ball joint seal in an embodiment similar to FIG. 4A, but in which the sliding rod is supported by a linear ball bearing.

The embodiment of FIGS. 3A and 3B is applicable to piping systems, whereby the ball joint seal 300 is configured to enable fluids to flow through the central passage 308 of the spherical element 302. The embodiments 400, 500 of FIGS. 4A, 4B, and 5 are configured to provide access by a sliding rod 402 into a sealed tank 200, whereby both the direction and the degree of axial penetration of the sliding rod 402 into the tank 200 is mechanically variable. The sliding rod 402 extends through the central passage 308 of the spherical element 302, and a seal is formed between the spherical element 302 and the sliding 402 rod by a rod support 404 or 502 within the central passage 308, by a rod O-ring seal 436, and also by at least one rod lip seal 410, discussed in more detail below with reference to FIG. 4B.

In the embodiment of FIGS. 4A and 4B, the rod support 404 is formed by packing. The illustrated embodiment further includes an inner sleeve 412 that surrounds a proximal region of the rod 402 and is advanced by a threaded region 434 into the spherical element 302 and locked in place by a locking collar 414, so that it presses against a proximal end of the packing 404. An outer, locking sleeve 416a, 416b surrounds the inner sleeve 412 and includes an engagement feature 418 that is configured to engage with the proximal end of the central passage 308 of the spherical element 302. The locking sleeve is shown in the figure in an unengaged configuration 416a and in an engaged configuration 416b. The locking sleeve 416a, 416b includes a plurality of set screws 420 that can be tightened to fix the inner sleeve 412 to the locking sleeve 416a, 416b, thereby preventing the inner sleeve 412 from becoming loose or backing out during operation, and ensuring that a consistent force is applied to the packing 404.

FIG. 4B presents a close-up cross sectional illustration of the rod lip seal 410 and rod O-ring seal 436 of FIG. 4A. The rod lip seal 410 is inserted into a recess provided in the spherical element 302 at one end of the central passage 308, and held in place by a collet 422, thereby being fixed to and sealed to the spherical element 302. A wiper blade 424 is pressed radially inward against the rod 402 by a canted coil spring 426 that surrounds the rod 402.

FIG. 5 is a cross sectional illustration of an embodiment 500 similar to FIG. 4A, except that a linear ball bearing 502 is implemented as the rod support. Also, the embodiment 500 of FIG. 5 includes rod lip seals 410 at both the proximal and distal ends of the central passage 308. In embodiments, the linear ball bearing 502 resists wear, and is thereby able to maintain a more accurate positioning of the rod 402 within the centers of the rod lip seals 410, so that the risk of leakage past the rod lip seals 410 and rod O-ring seal 436 is further reduced.

While the present invention does not require a sealing fluid to form a seal between the spherical element 302 and the housing 306, and in embodiments between the spherical element 302 and the rod 402, lubrication is sometimes desirable between the elements of the seal so as to reduce wear or to reduce leakage of process if the lip seal 310 or support rings 304 become damaged. In particular, the embodiments of FIGS. 4A through 5 include inlets 430 and vents 432 for providing and exchanging such lubrication.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A ball joint seal comprising:
a spherical element having an exterior surface, a portion of said exterior surface being a spherical portion, in that it is shaped as a portion of a sphere surrounding a spherical center, the spherical element being penetrated by a central passage having a longitudinal axis that passes through said spherical center;
a housing surrounding the spherical element;
a pair of support rings axially pressed against opposing sides of the spherical portion of the spherical element, the support rings being radially fixed to and sealed to the housing, at least one of the support rings being axially slidable relative to the housing;
at least one support spring configured to compress the support rings against the spherical element; and
a substantially annular ball lip seal encircling the spherical portion of the spherical element and surrounding the spherical center of the spherical element, the ball lip seal being located between the pair of support rings and being fixed to and sealed to the housing, the ball lip seal comprising a ball wiper blade that is pressed radially inward by a ball spring against the spherical portion of the spherical element to form a sliding seal therewith.

2. The ball joint seal of claim 1, wherein the lip seal includes a pair of ball wiper blades and corresponding ball springs.

3. The ball joint seal of claim 1, wherein both of the support rings are axially slidable relative to the housing, and the at least one support spring comprises a plurality of support springs configured to press both of the support rings toward the spherical element.

4. The ball joint seal of claim 1, further comprising:
a first fluid port providing fluid access to a proximal end of the central passage; and
a second fluid port providing fluid access to the distal end of the central passage;
the ball joint seal being thereby configured for implementation in a piping system.

5. The ball joint seal of claim 1, further comprising:
a sliding rod extending axially through the central passage and being axially slidable therethrough;

a rod support surrounding and radially supporting the sliding rod within the central passage, the rod support being fixed to and sealed to the spherical element; and a rod lip seal fixed and sealed to the spherical element at an end of the central passage, the rod lip seal comprising a rod wiper blade that is pressed radially inward against the sliding rod by a rod spring to form a sliding seal with the sliding rod.

6. The ball joint seal of claim 5, wherein the rod support is formed by a compressible packing, and wherein the ball joint seal further comprises:

an inner sleeve surrounding the sliding rod within the central passage axially adjacent to the rod support; and a compression mechanism configured to apply an axial force to the inner sleeve, thereby axially compressing the rod support and causing a radially inward expansion of the rod support against the sliding rod.

7. The ball joint seal of claim 5, wherein the rod support is formed by a linear ball bearing.

8. The ball joint seal of claim 7, wherein the ball joint seal comprises a pair of rod lip seals having corresponding rod wiper blades and rod springs, the pair of rod lip seals being fixed and sealed to the spherical element at opposing ends of the central passage.

9. The ball joint seal of claim 1, wherein the spherical element can be rotated about the longitudinal axis of the central passage over any desired angle.

10. The ball joint seal of claim 1, wherein the spherical element can be rotated about an axis perpendicular to the longitudinal axis of the central passage over a range of at least 30 degrees total angular variability.

\* \* \* \* \*